United States Patent [19]

Cech

[11] Patent Number: 5,713,109
[45] Date of Patent: Feb. 3, 1998

[54] SEAT BELT RETAINING DEVICE

[76] Inventor: Jerry Edward Cech, 4383 E. Mt. Morris, Mt. Morris, Mich. 48458

[21] Appl. No.: 586,183

[22] Filed: Jan. 16, 1996

[51] Int. Cl.⁶ .............................. A44B 11/00; A62B 35/00
[52] U.S. Cl. ..................... 24/200; 24/321; 24/198; 297/468
[58] Field of Search .................... 24/321, 320, 319, 24/318, 500, 637, 632, 633, 115 F, 3.4, 198, 199, 200; 297/468, 484

[56] References Cited

U.S. PATENT DOCUMENTS

| | | | |
|---|---|---|---|
| 685,252 | 10/1901 | Bugbee | 24/200 |
| 2,212,862 | 8/1940 | Hirsh | 24/198 |
| 2,224,773 | 12/1940 | Shaulson | 24/200 |
| 2,269,696 | 1/1942 | Shaulson | 24/200 |
| 3,161,931 | 12/1964 | Bif | 24/200 |
| 4,540,218 | 9/1985 | Thomas | 297/468 |
| 4,730,875 | 3/1988 | Yoshitsugu | 297/468 |
| 4,787,677 | 11/1988 | Reighter | 24/200 |
| 5,027,477 | 7/1991 | Seron | 24/3.4 |

FOREIGN PATENT DOCUMENTS 3526964  11/1986  Germany ............. 24/633

*Primary Examiner*—Victor N. Sakran
*Attorney, Agent, or Firm*—Eric C. Spencer

[57] ABSTRACT

A multi-purpose seat belt retaining device which provides a means for lowering the path of a seat belt for use by a child by removably inserting the lap and shoulder portion of a seat belt into slots on the device thereby lowering the intersection points of the lap and shoulder portion of the seat belt. In addition, the device also provides a means for allowing a person to enter and exit the driver side of a car without unbuckling the seat belt by removably placing a hook portion around the steering wheel and inserting both the lap and shoulder portion of the seat belt in a common slot. To allow the seat belt to engage around the driver, the device is simply unhooked from the steering wheel but is left secured onto the seat belt.

3 Claims, 5 Drawing Sheets

5,713,109

SEAT BELT RETAINING DEVICE

BACKGROUND

1. Field of Invention

This invention relates to seat belt retaining devices. More specifically, the invention is an improved multi-purpose seat belt retaining device for use by small infants and handicapped people.

2. Description of Prior Art

In recent years, the general public has become aware of the advantages of wearing protective seat belts while traveling in automobiles. In fact, many states have enacted statutes which require passengers to wear seat belts when traveling in a car. In almost every state, local laws also require that an infant be placed in a car seat or at a minimum wear a seat belt. However, with the present state of seat belt design, it is often difficult or impossible for a small child to safely wear a typical seat belt because the path of the seat belt is too high and therefore is uncomfortable and doesn't fit properly around a small child. Therefore, parents with small children are faced with a dilema, their child is too large to fit in a car seat or booster seat and the seat belt as it presently exists does not adequately secure a child in the seat. To correct this problem, many inventions have been conceived which lower the path of the seat belt as it crosses the child's body. However, most such inventions are either improvements to the installation of the seat belt in the car and therefore impractical as an everyday item, or are not designed to withstand the huge inertial forces generated during a car accident and therefore unsafe to use.

Another problem with the present state of the typical seat belt is that unless they are automatic (commonly referred to as passive restraint), to engage a lap/seat belt in todays automobile, the driver must reach up and just behind their head to grap the retracted seat belt. This motion, for people with a reduced range of motion, is often impossible or extremely painful. As a result, these people refrain from using their seat belt, which not only exposes them to a greater risk of physical harm while driving, it also exposes them to tickets in states that require the use of seat belts. Presently, no prior art exists which allows a person to enter and exit a car without first engaging or disengaging the seat belt.

OBJECTS AND ADVANTAGES

Accordingly, several objects and advantages of the invention are:

To provide an automatic means for retaining a seat belt in an open configuration with the seat belt still engaged thereby allowing the driver to enter and exit the car without need to disengage and engage the seat belt.

To provide for a person with physical impediments a permanent means to secure a seat belt while still providing a means for entry and egress from the vehicle.

To provide a seat belt adjustment means which allows for the use of a typical lap/shoulder type seat belt by a small person like a child or a small adult.

To provide a seat belt adjustment means for use by a small child or adult which safely adjusts the path of the seat belt to provide for maximum crash protection, thereby reducing the chances of injury.

DRAWING FIGURES

Reference Numerals in Drawings

| | |
|---|---|
| 10 | first preferred embodiment seat belt retaining device |
| 12 | hook means |
| 14 | first vertical leg |
| 16 | notch means |
| 18 | first seat belt retaining means |
| 20 | first seat belt slot |
| 22 | horizontal leg |
| 24 | second seat belt retaining means |
| 24a | first vertical seat belt retaining means |
| 24b | second vertical seat belt retaining means |
| 26 | second seat belt slot |
| 28 | third seat belt slot |
| 30 | second vertical leg |
| 32 | steering wheel retaining slot |
| 33 | web |
| 34 | driver side car door |
| 36 | driver side shoulder seat belt |
| 37 | driver side seat belt |
| 40 | car steering wheel |
| 42 | driver side lap seat belt |
| 100 | second preferred embodiment seat belt retaining device |
| 116 | fractured notch means |
| 117 | first vertical leg |
| 118 | first seat belt retaining means |
| 120 | first seat belt slot |
| 122 | horizontal leg |
| 124 | second seat belt retaining means |
| 124a | first vertical seat belt retaining means |
| 124a | first vertical seat belt retaining means |
| 124b | second vertical seat belt retaining means |
| 126 | second seat belt slot |
| 128 | third seat belt slot |
| 130 | second vertical leg |
| 133 | web |
| 136 | shoulder seat belt section |
| 142 | lap seat belt section |
| 144 | small passenger |

DESCRIPTION

Figure 1:
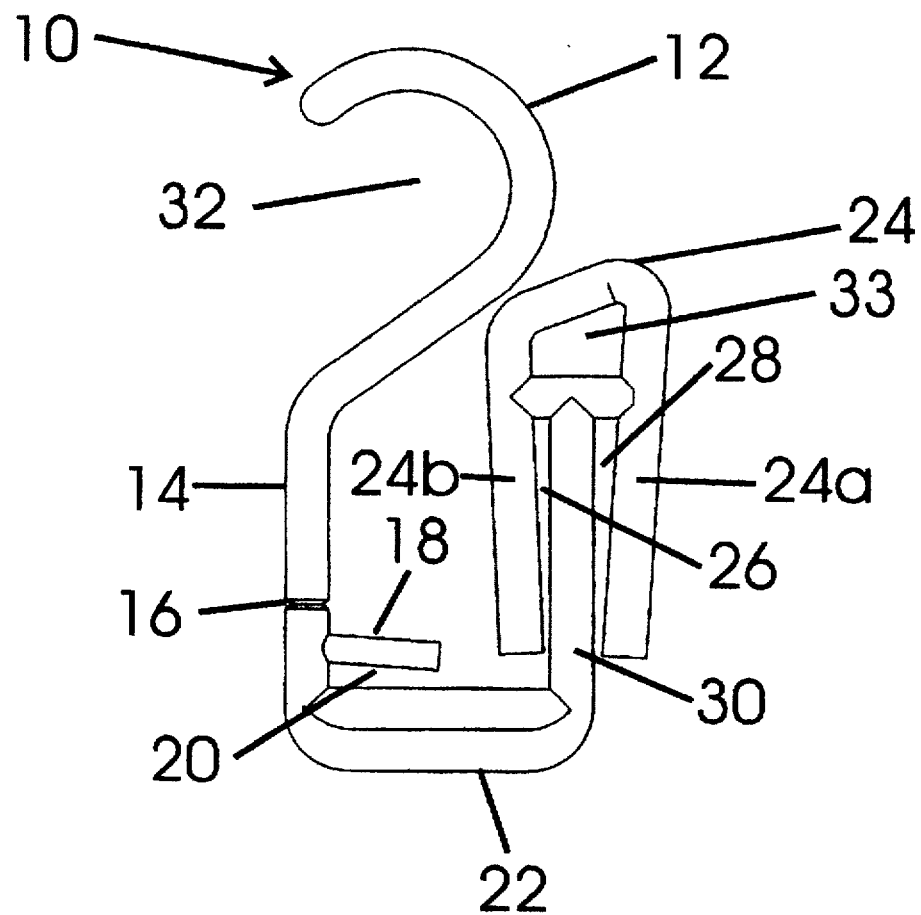
FIG. 1 is a side plan view of the first preferred embodiment of the seat belt retaining device.
Figure 2:
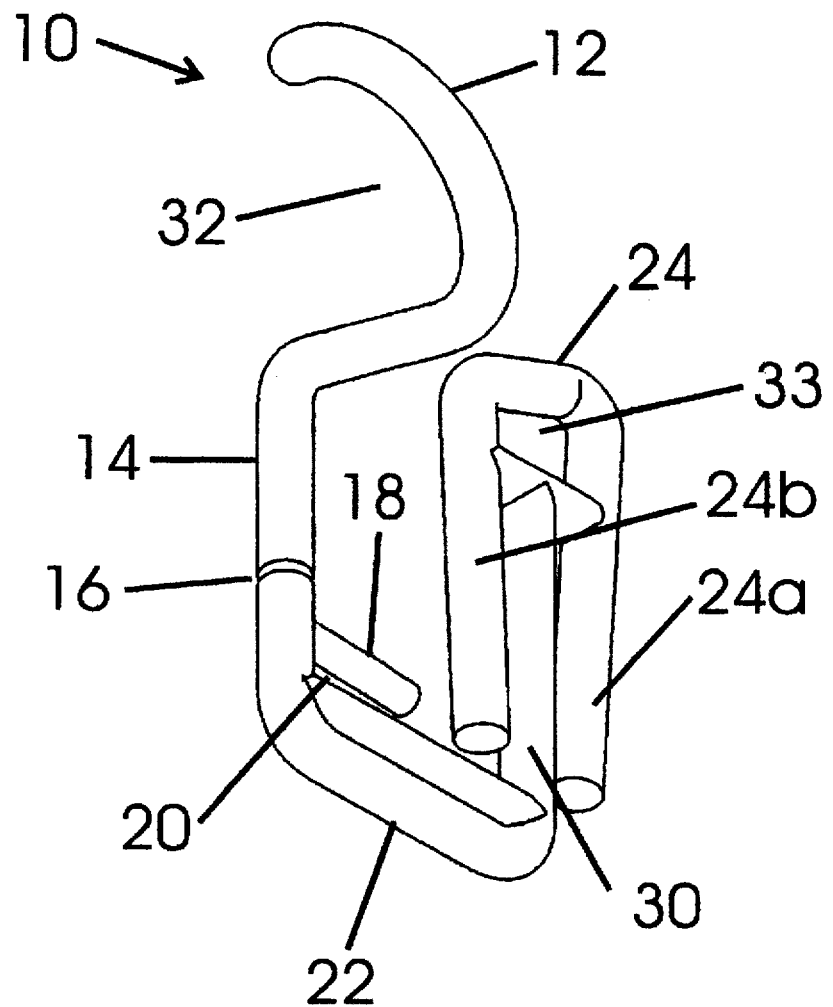
FIG. 2 is a perspective view of the first preferred embodiment of the seat belt retaining device.

Referring to FIG. 1 and FIG. 2, a first preferred embodiment seat belt retaining device 10 is shown which is comprised of a hook means 12 which is a radially shaped structure sized to fit around a typical car steering wheel 40. Protruding from the bottom quadrant of the hook means 12 is a first vertical leg 14 which is sufficient in size and length to support the stress associated with holding a driver side seat belt 37 in an open position.

Located on the first vertical leg 14 approximately three-quarters of the way down (3"–5") is a notch means 16 which is an indentation cut along the outside edge of the first vertical leg 14. The notch means 16 acts as a stress riser, thereby causing the first vertical leg 14 to fracture at this predetermined position to alter the configuration of the invention from the first preferred embodiment 10 to the second preferred embodiment 100 (FIG. 4) when so desired by the user.

Slightly beneath the notch means 16 is a first seat belt retaining means 18 which protrudes perpendicularly approximately one inch from the inside edge of the first vertical leg 14. Rigidly affixed and perpendicular to the bottom distal end of the first vertical leg 14 is a horizontal leg 22 with a cross sectional area sufficient to withstand the bending loads as a result of working against the seat belt tension springs. A first seat belt slot 20 is formed by virtue of the gap created between the first seat belt retaining means 18 and the horizontal leg 22. Rigidly affixed to the right distal end and perpendicular to the horizontal leg 22 is a second vertical leg 30. The second vertical leg 30 is an elongated section which extends upwardly and secures a second seat belt retaining means 24 just under the bottom right quadrant of the hook means 12. The second seat belt retaining means 24 comprises a first vertical seat belt retaining means 24a, a second vertical seat belt retaining means 24b, a second seat belt slot 26, a third seat belt slot 28 and a web 33. The first vertical seat belt retaining means 24a extends downwardly from the second seat belt retaining means 24, thereby forming the angular second seat belt slot 26. The second vertical seat belt retaining means 24b also extends downwardly from the right side of the second seat belt retaining means 24, thereby forming the angular third seat belt slot 28. The web 33 spans between the separation of the first vertical seat belt retaining means 24a and the second vertical seat belt retaining means 24b and acts to increase the structural rigidity of the device.

Figure 4:
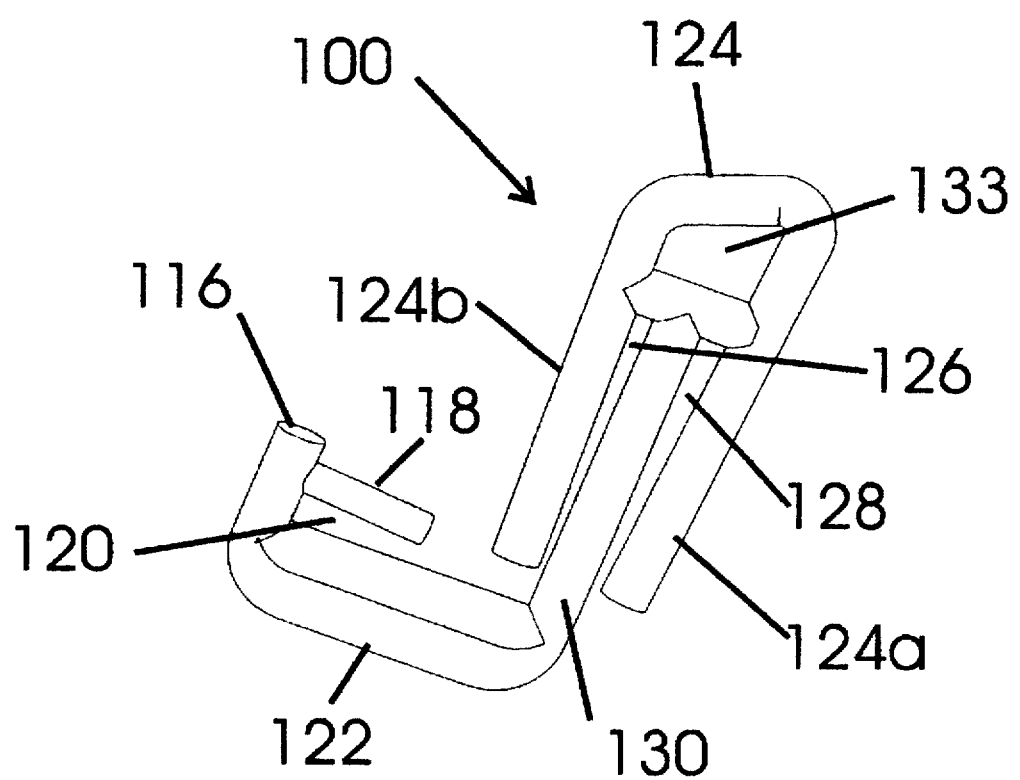
FIG. 4 is a perspective view of the second preferred embodiment of the seat belt retaining device.

Now referring to FIG. 4, a second preferred embodiment seat belt retaining device 100 is shown which is obtained by simply causing the first preferred embodiment 10 to be broken at the notch means 16 and discarding the hook means 12 and the first vertical leg 14. The second preferred embodiment 100 is comprised of a fractured notch means 116 which is located at the top distal end of a first vertical leg 117. Protruding approximately one inch from the inside edge of the first vertical leg 117, just below the fractured notch means 116 is a first seat belt retaining means 118.

Rigidly affixed and perpendicular to the lower distal end of the first vertical leg 117 is a horizontal leg 122. The horizontal leg 122 is sufficient in cross sectional area to withstand bending loads created by a seat belt and extends rightward from the first vertical leg 117. A first seat belt slot 120 is created by the gap between the first vertical leg 117 and the horizontal leg 122 and the first seat belt slot 120 is sized to insertably accept and retain a typical seat belt web.

Rigidly affixed and perpendicular to the right distal end of the horizontal leg 122 is a second vertical leg 130 which extends upwardly and rigidly attaches at its top distal end to a second seat belt retaining means 124.

The second seat belt retaining means 124 is comprised of a first vertical seat belt retaining means 124a which extends downwardly slightly unparallel to the left side of the second vertical leg 130, a second vertical seat belt retaining means 124b which also extends downwardly slightly unparallel to the right side of the second vertical leg 130.

The second seat belt retaining means 124 further having a second seat belt slot 126 which is created by the gap between the second vertical leg 130 and the first vertical seat belt retaining means 124a. The second seat belt slot 126 being appropriately sized to insertably accept and retain the web of a typical seat belt webbing.

The second seat belt retaining means 124 still further having a second seat belt slot 128 which is created by the gap between the second vertical leg 130 and the second vertical seat belt retaining means 124b. The second seat belt slot 128 being appropriately sized to insertably accept and retain the web of a typical seat belt webbing.

Located at the top distal end of the second vertical leg 130 and spanning across the space between the first vertical seat belt retaining means 124a and the second vertical seat belt retaining means 124b is a web 133, which is provided as a structural web to increase the rigidity of the device.

Operation

Figure 3:
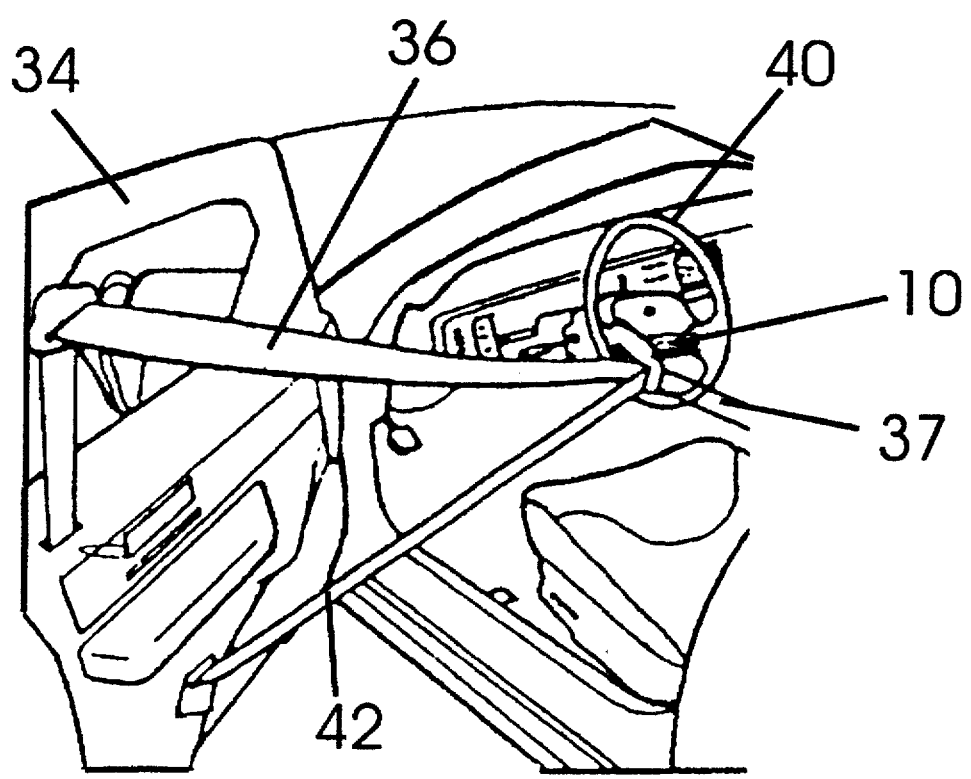
FIG. 3 is a perspective view of the first preferred embodiment installed around a steering wheel and retaining the seat belt in an open configuration with the seat belt still fully latched and engaged.

Now referring to FIG. 3, which depicts the first preferred embodiment seat belt retaining device 10 inserted around a steering wheel 40 at essentially a 9:00 o'clock position. In this configuration the seat belt retaining device 10 alters the path of a typical seat belt to an open position even with the seat belt still engaged and locked closed when the driver side car door 34 is in an open position. This therefore allows a person to exit and enter lo the vehicle without disengaging and re-engaging the seat belt lock.

Referring now to FIG. 1, FIG. 2, and FIG. 3, the web of the driver side lap seat belt 42 and the web of the driver side shoulder seat belt 36 are slidably inserted into the first seat belt slot 20. The hook means 12 is then inserted onto the car steering wheel 40 at essentially a 9:00 o'clock position. In this configuration, when the driver side car door 34 is opened, the driver may exit or enter the car without disengaging the seat belt from the locking buckle. When a driver enters the vehicle and wishes to start driving, the seat belt retaining device 10 is simply removed from the car steering wheel 40 and this allows the seat belt to safely engage around the driver and protect the driver in case of an accident. The seat belt retaining device 10 remains engaged on the seat belt at all times. When the driver is ready to exit from the vehicle, the seat belt retaining device 10 is simply rehooked around the steering wheel 40 and when the driver side car door 34 is opened, the seat belt path will be altered as shown in FIG. 3 to allow for the passenger to enter and exit the car without disengaging the seat belt.

Figure 5:
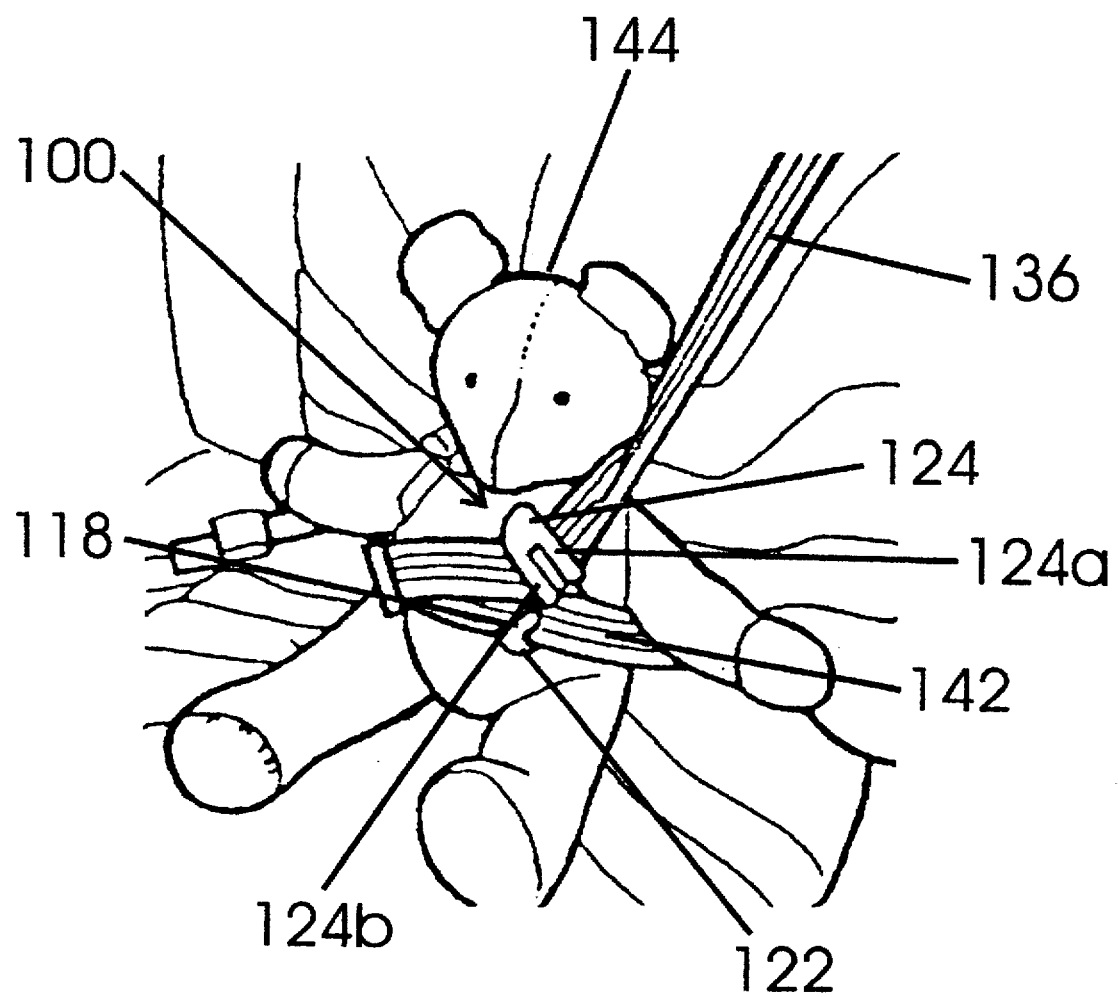
FIG. 5 is a perspective view of the second preferred embodiment installed on a seat belt thereby safely and comfortably fitting around a small passenger.

Referring now to FIG. 4 and FIG. 5, which generally shows the structure and installation of the second preferred embodiment of the seat belt retaining device 100. The seat belt retaining device 100 also alters the path of a typical seat belt, however, it does this so a child or small adult may safely wear a typical seat belt as shown in FIG. 5.

The use and operation of the seat belt retaining device 100 is very simple and straight forward. A shoulder seat belt section 136 is first slidably inserted into the third seat belt slot 128. The shoulder seat belt section 136 is then passed over the second vertical leg 130 and then is slidably inserted into the second seat belt slot 126. The shoulder seat belt section 136 then continues on its normal path where it intersects with a lap seat belt section 142 at the seat belt buckle (not shown).

The lap seat belt section 142 is slidably inserted into the first seat belt slot 120 and also continues on its normal path where it intersects with the shoulder seat belt section 136 at the seat belt buckle. In this configuration, the seat belt path has been altered so that it enters and exits at lower points in relation to a small passenger 144. This new path allows a small passenger 144 to safely and comfortably use a typical seat belt without the need for a child seat or booster seat. The seat belt retaining device 100 may remain inserted around the seat belt and should require no additional adjustments once properly installed.

Summary, Ramifications and Scope

Thus the reader can see that an improved device is presented which provides two alternate functions from essentially the same structure. First, a seat belt retaining device is provided which aids people with physical impediments by allowing them to enter and exit their car without disengaging or re-engaging the seat belt. This device therefore eases the driver's difficult of reaching behind themselves to pull the seat belt down and engage it in the locking buckle. For people with physical impediments, this motion can be very difficult and painful and sometimes simply impossible. Many people refrain from using seat belts just for this reason, thereby exposing themselves to increased risk of physical harm in case of an accident. With the use of this device, people will be more inclined to use the seat belt and thereby better protect themselves.

Also disclosed is a second seat belt retaining device which simply installs on a typical seat belt and alters the path of the belt so that it may comfortably and safely engage around a child or small adult. Most, if not all seat belts on the market today are not designed to safely engage around a small passenger even though most state laws don't require the use of a car seat or booster seat after the age of four. A typical four year old is not large enough to be adequately protected by the existing path of today's seat belts. The second seat belt retaining device corrects this problem by altering the path of the seat belt so that it safely and comfortably engages around a small passenger.

Although the description above contains many specifications, these should not be construed as limiting the scope of the invention but as merely providing illustrations of some of the presently preferred embodiments of this invention.

Thus, the scope of the invention should be determined by the appended claims herein and their legal equivalents, rather than by the examples given.

I claim:

1. A seat belt retaining device comprising,
   a. a hook means having a structural cross section, said hook means having an open radial shape appropriately sized to be removably inserted and engaged around a typical automobile steering wheel frame,
   b. a first vertical leg having a similar cross section to said hook means, said first vertical leg extending downwards from a bottom quadrant of said hook means,
   c. a first seat belt retaining means extending approximately one to two inches inwardly and perpendicular from said first vertical leg just slightly above a bottom distal end of said first vertical leg which acts to insertably engage and secure a seat belt web,
   d. a horizontal leg rigidly affixed and perpendicular to the bottom end of said first vertical leg having a structural cross section sized appropriately to withstand the loads generated by a seat belt retraction spring when said seat belt retaining device is secured around a seat belt in an open seat belt path,
   e. a first seat belt slot which is created by the gap between said first seat belt retaining means and said horizontal leg, thereby allowing the insertion and control of a seat belt web, further restraining the seat belt path in a fixed and predetermined manner,
   f. a second vertical leg rigidly affixed and perpendicular to the right distal end of said horizontal leg, said second vertical leg extending upwardly and thereby ending just slightly beneath the right quadrant of said hook means acting to secure a seat belt in an open position when said seat belt retaining device is engaged around a steering wheel frame, thereby allowing the ingress and egress of passengers without the need to disengage the seat belt from its buckle.

2. The seat belt retaining device of claim 1, further comprising,
   a. a botch means being located approximately two-thirds of the way down the longitudinal length of said first vertical leg, said notch means being a chamfer around the periphery of said first vertical leg, said notch means acting as a stress concentrator, thereby acting to insure that said first vertical leg fractures at a predetermined position along said notch means.

3. In a seat belt retaining device for altering the path of a seat belt to safely engage around a small adult or child comprising,
   a. a fractured notch means located at a top distal end of a first vertical leg, said first vertical leg extending downwards from said fractured notch means,
   b. a first seat belt retaining means extending approximately one to two inches inwardly and perpendicular from said first vertical leg just slightly above a bottom distal end of said first vertical leg which acts to insertably secure a lap portion of a seat belt web,
   c. a horizontal leg rigidly affixed and perpendicular to the bottom end of said first vertical leg having a cross section sized to withstand the loads generated by a car crash thereby safely securing a small passenger while maintaining a comfortable and effective seat belt path,
   d. a first seat belt slot which is created by a gap between said first seat belt retaining means and said horizontal leg, said first seat belt slot sized to insertable engage the web of a seat belt, thereby allowing the insertion and control of a seat belt web,
   e. a second vertical leg rigidly affixed and perpendicular to the fight distal end of said horizontal leg, said second vertical leg extending upwardly appropriately to fit between a lap portion and a shoulder portion of a typical seat belt,
   f. a second seat belt retaining means rigidly affixed to a top distal end of said second vertical leg, said, second seat belt retaining means further comprising a first and a second vertical seat belt retaining means both extending downwardly from opposing sides of said second seat belt retaining means thereby forming a second and a third seat belt slot which insertably accepts and secures the shoulder portion of a seat belt and in conjunction with said first seat belt slot alters the path of a seat belt by reducing the angle of the seat belt as it crosses the from of a small passenger sitting in a car seat, thereby allowing a small adult or child to safely interface and be secured by a new path of the seat belt.

* * * * *